United States Patent [19]
Corves et al.

[11] Patent Number: 6,050,172
[45] Date of Patent: Apr. 18, 2000

[54] PNEUMATICALLY OPERATED MECHANISM

[75] Inventors: Burkhard Corves, Zug; Rudolf Schwegler, Küsnacht; Leo Diehm, Cham, all of Switzerland

[73] Assignee: Emhart Glass S.A., Cham, Switzerland

[21] Appl. No.: 09/040,542

[22] Filed: Mar. 17, 1998

[30] Foreign Application Priority Data

Apr. 4, 1997 [GB] United Kingdom .................... 9706890
Dec. 20, 1997 [GB] United Kingdom .................... 9726866

[51] Int. Cl.$^7$ ................................................. F15B 11/044
[52] U.S. Cl. .......................................... 91/450; 91/DIG. 2
[58] Field of Search .......................... 91/450, 433, DIG. 2

[56] References Cited

U.S. PATENT DOCUMENTS 1,278,917  9/1918  Hall ........................................... 91/450

FOREIGN PATENT DOCUMENTS 2125905  3/1984  United Kingdom .................... 91/450

*Primary Examiner*—F. Daniel Lopez
*Attorney, Agent, or Firm*—Spencer T. Smith

[57] ABSTRACT

A pneumatically operated mechanism for a glass machine comprises a piston and cylinder device, first and second air lines leading to opposite sides of the piston, and first and second control means for controlling the passage of air through the air lines, which control means each comprise an operating valve and a speed control valve. The valves are solenoid operated and by control of the timing of operation of the valves the speed of movement of the piston and the degree of cushioning at the ends of its stroke may be adjusted. In a modified mechanism pressure sensors which sense the pressures in the piston and cylinder device are connected to a processor which is adapted in response to data sensed by the sensors to operate the valves to obtain a desired movement of the piston.

5 Claims, 15 Drawing Sheets

PNEUMATICALLY OPERATED MECHANISM

The invention relates to pneumatically operated mechanisms particularly for use in glass bottle making machinery.

BACKGROUND TO THE INVENTION

Glass bottle making machinery, especially the well-known Individual Section or I.S. machine, usually comprises a number of separate pneumatically operated mechanisms which operate in sequence in the manufacture of a bottle. Examples of such mechanism are the baffle mechanism, the funnel mechanism, mould opening and closing, the blow head mechanism etc.

Very heavy demands are made on the pneumatic mechanisms in the operation of the machine: firstly they are required to operate at high speed, to achieve the desired production rates. At the same time effective cushioning must be provided at the ends of the strokes of the mechanism to reduce wear and vibration. Further it is desirable to be able to adjust the speed and cushioning of the mechanism. With conventional mechanisms such adjustments have necessitated manual adjustments to needle valves incorporated in the machines, a task which is difficult and dangerous.

It is an object of the present invention to provide an improved pneumatically operated mechanism for use in a glass bottle making machine.

SUMMARY OF THE INVENTION

The present invention provides as one of its features a pneumatically operated mechanism for controlling the movement of an operating member comprising:

a piston and cylinder device comprising a piston mounted in a cylinder and dividing the cylinder into first and second chambers with the operating member connected to the piston;

first and second air lines leading to the first and second chambers respectively control means for controlling the passage of air through one of the air lines comprising;

an operating valve in said air line movable between a first position in which the respective chamber is connected to exhaust through a restriction and a second position in which said chamber is connected to a supply of compressed air;

a speed control valve;

a control line connecting the speed control valve to the air line between the chamber and said operating valve;

the speed control valve being movable between a first, open, position in which the control line is connected to exhaust through a restriction and a second, closed, position in which the control line is not so connected;

the operating valve and the speed control valve being adapted to operate at appropriate times to control the movement of the piston in response to appropriate signals provided by an external control system.

A pneumatically operated mechanism as set out in the last preceding paragraph allows for control of the movement of the piston and operating member in one direction: while this may provide an advantage over prior conventional pneumatically operated mechanisms, it is usually desirable to provide for control of such movement in both directions.

The present invention also provides as one of its features a pneumatically operated mechanism for controlling the movement of an operating member comprising:

a piston and cylinder device comprising a piston mounted in a cylinder and dividing the cylinder into first and second chambers with the operating member connected to the piston;

first and second air lines leading to the first and second chambers respectively first and second control means for controlling the passage of air through the first and second air lines respectively each control means comprising;

an operating valve in the respective air line movable between a first position in which the respective chamber is connected to exhaust through a restriction and a second position in which said chamber is connected to a supply of compressed air;

a speed control valve;

a control line connecting the speed control valve to the air line between the chamber and the operating valve;

the control valve being movable between a first, open, position in which the control line is connected to exhaust through a restriction and a second, closed, position in which the control line is not so connected;

the valves of the two control means being adapted to operate at appropriate times to control the movement of the piston in response to appropriate signals provided by an external control system.

The present invention also provides, as another of its features, a method of controlling the movement of an operating member comprising the use of a mechanism according to the last preceding paragraph and providing signals from a control system which procures the following sequence:

(a) the piston is at the first end of the chamber the operating valve of the first control means is closed, connecting the first chamber to exhaust through a narrow restriction the control valve of the first control means is open, connecting the first chamber to exhaust through only a slight restriction the operating valve of the second control means is open, connecting the second chamber to compressed air;

the control valve of the second control means is closed.

(b) the second operating valve is closed connecting the second chamber through a narrow restriction to exhaust and the second control valve is opened, connecting the second chamber to exhaust through only a slight restriction.

(c) the first operating valve is opened, connecting the first chamber to compressed air and the first control valve is closed, so that the piston moves from the first end towards the second end of the cylinder;

(d) the second control valve is closed, restricting the exhaust from the second chamber through the narrow restriction associated with the second operating valve, thus cushioning the end motion of the piston as it moves to the second end of the chamber.

A pneumatically operated mechanism according to the invention shows many advantages. The external control system may conveniently be a conventional timing system which can be arranged to be adjusted by a hand held terminal, and this enables the timing and speed of motion of the mechanism to be adjusted without requiring access to the machine. Also the speed of the mechanism can be increased without any effect on the cushioning. As well as these advantages the simplicity of the system means that it is both cheaper and occupies less space in the machine.

However in the mechanism just set out the timing of the operation of the valves is set by the operator, e.g. by the hand held terminal, essentially by trial and error to obtain a desired speed of operation and degree of cushioning of the pneumatic mechanism. While this can be very effective providing that the operator is skillful and experienced, it is dependent on him.

It is a further object of the present invention to provide a self regulating pneumatically operated mechanism for controlling the movement of an operating member in a glass bottle making machine.

The present invention provides a pneumatically operated mechanism for controlling the movement of an operating member comprising a piston and cylinder device comprising a piston mounted in a cylinder and dividing the cylinder into first and second chambers with the operating member connected to the piston and first and second air lines leading to the first and second chambers respectively first and second control means for controlling passage of air through the first and second air lines respectively each such control means comprising an operating valve in the respective air line moveable between a first position in which the respective chamber is connected to exhaust through a restriction and a second position in which said chamber is connected to a supply of compressed air a speed control valve a control line connecting the control valve to the air line between the respective chamber and the operating valve the speed control valve being moveable between a first, open, position in which the control line and the chamber are connected to exhaust through a restriction and a second closed position in which the control line and the chamber are not so connected a sensor for sensing the pressure in the respective air line and chamber and a processor adapted in response to pressure data sensed by the sensors to operate the operating valves and the speed control valves to obtain the desired movement of the piston.

There now follows a description, to be read with reference to the accompanying drawings, of three pneumatically operated mechanisms according to the invention.

DETAILED DESCRIPTION OF THE INVENTION

Figure 1:
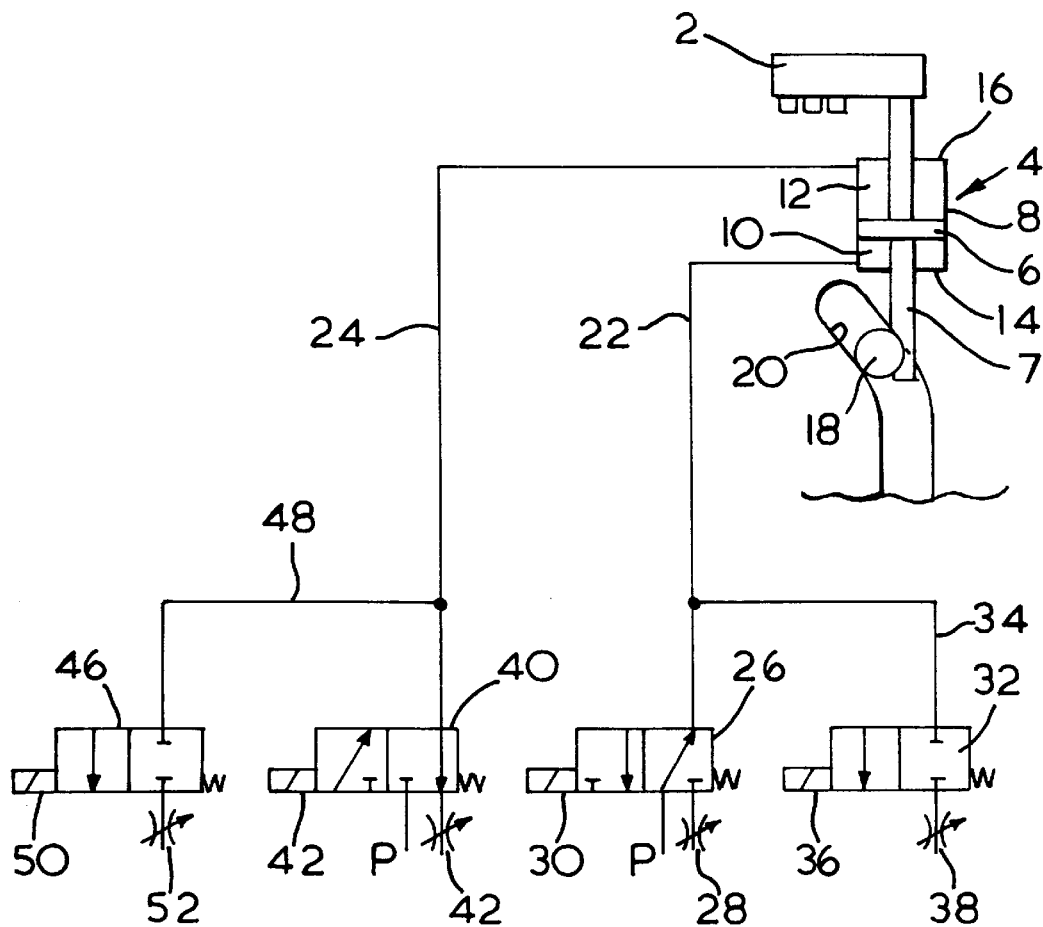
FIG. 1 shows diagrammatically a first pneumatically operated mechanism for controlling the movement of a blow head on a glass container forming machine.

FIG. 1 shows a pneumatically operated mechanism for controlling the movement of an operating member, namely a blow head (shown diagrammatically at 2), in a glass container forming machine. The mechanism comprises a vertical piston and cylinder device 4 comprising a piston 6 on a piston rod 7 mounted in a cylinder 8 and dividing the cylinder into a first, lower, chamber 10 extending to a first end portion 14 of the cylinder 8, and a second, upper chamber 12 extending to second end portion 16 of the cylinder 8.

The blow head 2 is connected to the piston rod 7, and a cam roll 18, also connected to the piston rod 7, runs in a cam track 20 which is so arranged that on vertical movement of the piston 6 and rod 7, a desired up and down and arcuate movement is given to the blow head 2 to carry it between an operative position in contact with blow moulds of the machine and an out of the way position.

The mechanism comprises a first air line 22 leading to the first, lower, chamber 10, and a second air line 24 leading to the second, upper, chamber 12, and first and second control means for controlling the passage of air through the first and second air lines.

The first control means comprises a normally open up operating valve 26 movable between a first, closed position in which the first chamber 10 is connected to exhaust through an adjustable restriction 28 and a second, open, position in which the first chamber 10 is connected to a source P of compressed air. Movement of the valve 26 between its first and second positions is obtained by operation of a solenoid 30 which operates in response to signals received from an external control system, viz a timing system of the machine.

The first control means also comprises a normally closed down speed control valve 32 and a control line 34 which connects the control valve 32 to the air line 22 between the chamber 10 and the operating valve 26.

The speed control valve 32 is movable, by operation of a solenoid 36, between a first, open, position, in which the control line 34 is connected to exhaust through an adjustable restriction 38, and a second, closed, position in which the control line 34 is not so connected.

The second control means closely resembles the first control means, and comprise a normally closed down operating valve 40 movable by a solenoid 42 between a first, closed, position in which the second chamber 12 is connected to exhaust through an adjustable restriction 44, and a second, open, position in which the second chamber 12 is connected to compressed air P, and a normally closed up speed control valve 46 and a control line 48 which connects the control valve 46 to the air line 24 between the chamber 12 and the operating valve 40. The control valve 46 is moveable by operation of a solenoid 50 between a first, open, position in which the control line 48 is connect to exhaust through an adjustable restriction 52, and a second, closed, position in which the control line 48 is not so connected.

In the case of a blow head in a glass container forming machine, the critical movement of the head is that which takes place when the blown container has been formed and the blow head must be removed as quickly as possible from a position in contact with blow moulds in which the containers are formed into a position in which a take out mechanism can approach the blow mould ready to grasp and remove the formed containers when the mould is open. The time taken for the blow head to perform this movement is dead time, i.e. no forming operation takes place during this time so that any saving of this time leads to a reduction of the cycle time of the machine and thus to an increase in productivity.

Consequently, while the mechanism just described comprises two control means, it can be advantageous to employ a pneumatically operated mechanism incorporating only one control means, viz the second control means comprising the up speed control valve 46.

Figure 2:
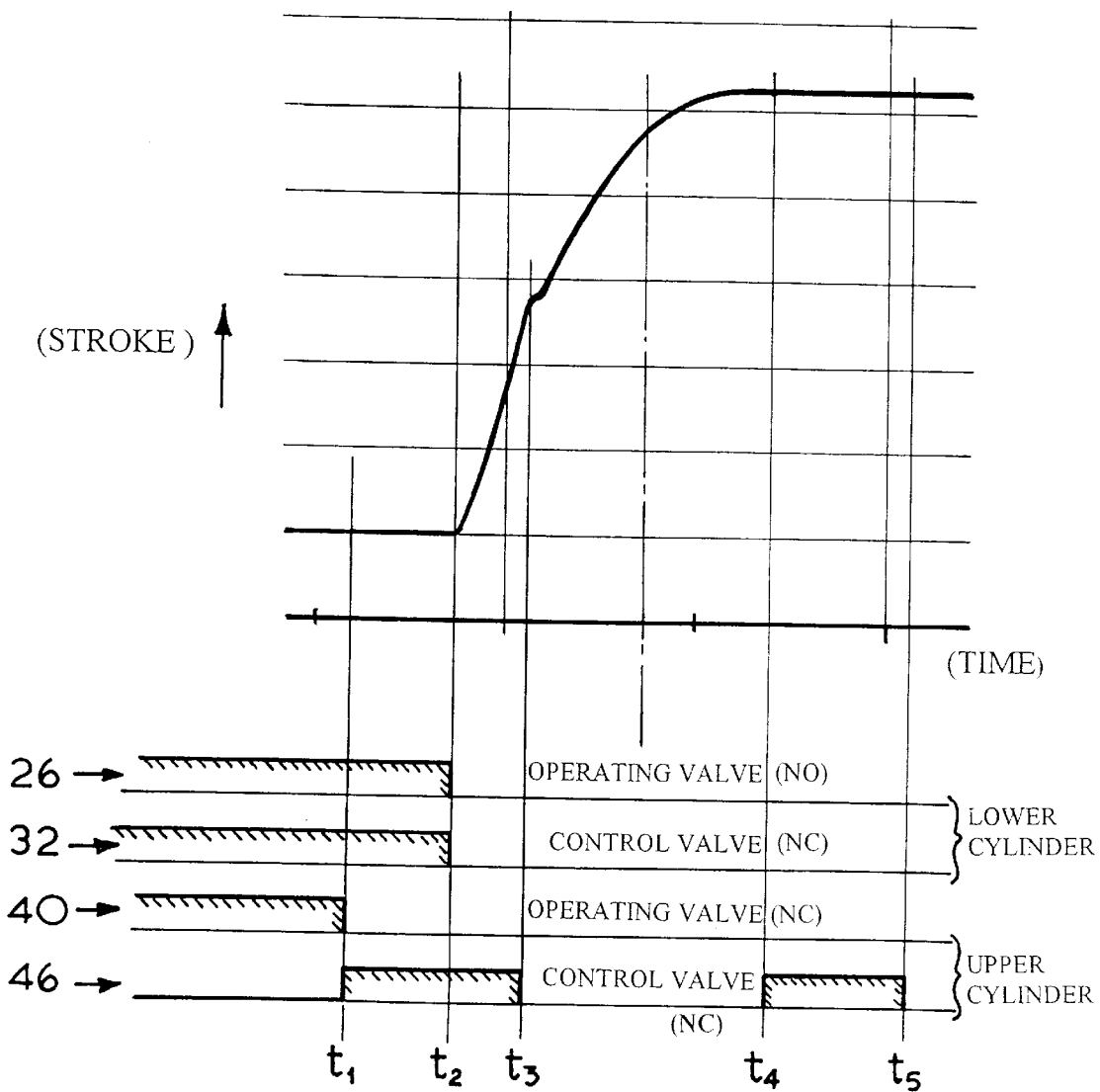
FIG. 2 shows a timing sequence of the mechanism of FIG. 1.

FIG. 2 illustrates the operation of the mechanism to carry a blow head up and away from its operative position in contact with the blow moulds.

(a) Prior to time $t_1$:

The blow head 2 is in contact with the blow moulds.

The second, down, operating valve 40 is activated into its open position, thus connecting the line 24 to compressed air and pressurising the chamber 12 to hold the blow head down.

The first, up, operating valve 26 is activated into its closed position, thus connecting the line 22 to exhaust through the restriction 28. The restriction 28 is adjusted so that it is highly restrictive of air flow.

The first speed control valve 32 is activated into its open position thus connecting the line 22 to exhaust through the restriction 38, which is adjusted so that it is only slightly restrictive of air flow.

The second speed control valve 46 is not activated and is thus in its closed position so that the line 24 is not connected to exhaust.

(b) At time $t_1$,

The second, down, operating valve 40 is inactivated, thus moving to its closed position connecting the upper chamber 12 to exhaust through the restriction 44 which is adjusted so that it is highly restrictive of air flow.

The second speed control valve 46 is activated thus connecting the chamber 12 to exhaust through the restriction 52, which is adjusted so that it is only slightly restrictive of air flow.

(c) At time $t_2$:

Between $t_1$ and $t_2$ the upper chamber 12 is exhausting, at a rate controlled by adjustment of the restrictions 44 and 52. At time $t_2$, which is a selected time after $t_1$:

The first, up, operating valve 26 is deactivated and moves to its open position, thus connecting the line 22 and the chamber 10 to compressed air.

The first speed control valve 32 is deactivated, breaking the connection between the line 22 and exhaust.

Rapid upward movement of the piston 6 thus is initiated: the speed of such movement will be determined not only by the pressure of the compressed air but also by the extent to which the upper chamber 12 has been exhausted between $t_1$ and $t_2$, as determined by the restrictions 44 and 52.

(d) At time $t_3$;

The second control valve 46 is deactivated and returns to its closed position in which the line 24 is not connected to exhaust through the restriction 52. Venting of air from the upper chamber 12 is thus confined to the air which will pass through the restriction 44 which is highly restrictive. Pressure will thus build up in the chamber 12 and begin to slow down the upward movement of the piston 6, effectively cushioning the end of the upward stroke of the piston 6.

(e) At time $t_4$

The control valve 46 is activated to connect the line 24 again to exhaust through the restriction 52, thus to release any residual pressure in the chamber 12.

It will be understood that downward movement of the piston is controlled in an analagous manner.

Use of the pneumatically operated mechanism just described allows for very precise control of movement of the piston 6 determined in part by adjustment of the timing signals given to the various valves, and in part by adjustment of the various restrictions leading to exhaust.

With appropriate adjustments, the pneumatically operated mechanism just described can obtain movement of a blow head from a position in contact with the blow moulds into a position out of the way of the take out mechanism within 250 milliseconds, compared with about 350 milliseconds with conventional pneumatic operating mechanism.

Figure 3:
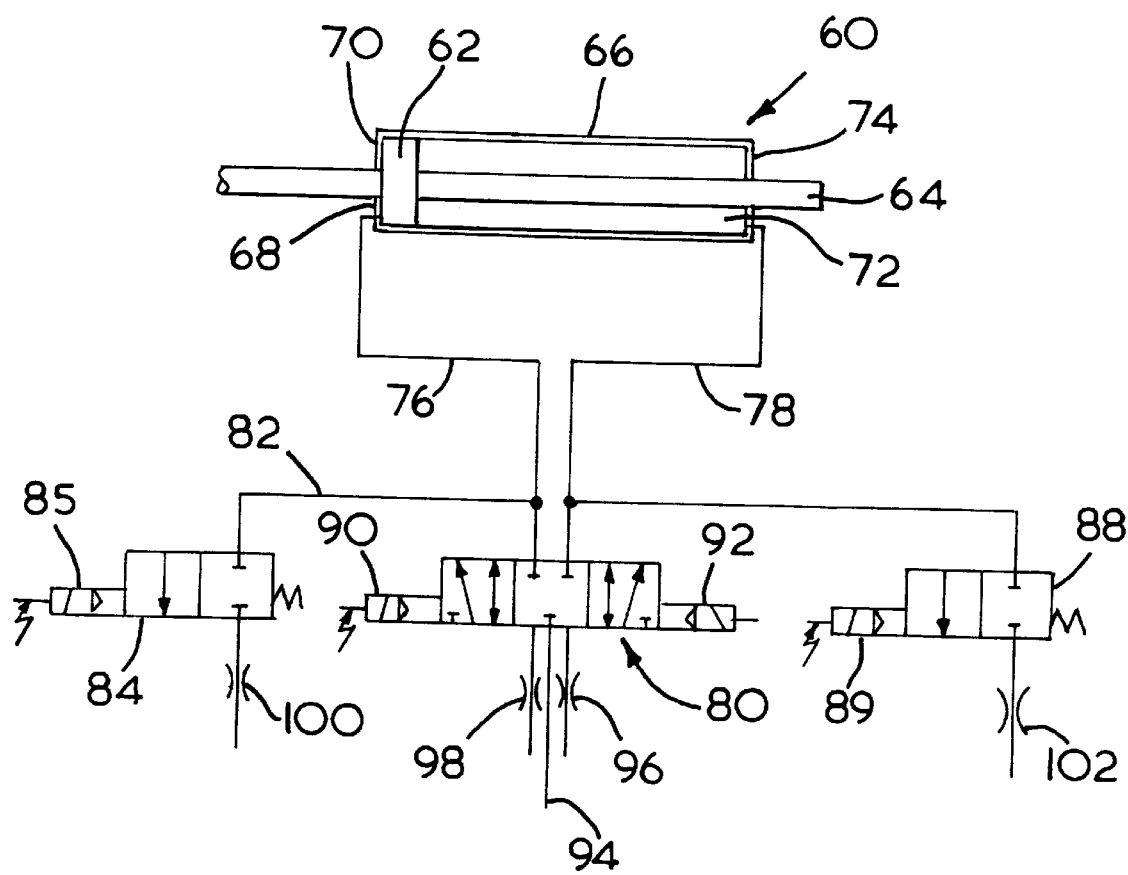
FIG. 3 shows a second mechanism, similar to that of FIG. 1, adapted for use in a mould opening and closing mechanism.

FIG. 3 shows the application of a similar arrangement to provide a pneumatically operated mould opening and closing mechanism in a glass container forming machine.

The mould opening and closing mechanism comprises a horizontal piston and cylinder device 60 comprising a piston 62 on a piston rod 64 mounted in a cylinder 66 and dividing the cylinder into a first chamber 68 extending to a first end 70 of the cylinder 66, and a second chamber 72 extending to a second end 74 of the cylinder 66. The piston rod 64 is connected, in a conventional manner, to mould mechanism of the machine.

The mould opening and closing mechanism comprise a first air line 76 leading to the first chamber 68, and a second air line 78 leading to the second chamber 72, and first and second control means for controlling the passage of air through the air lines 76 and 78.

A main valve 80 serves as an operating valve for both the first and second control means. The valve 80 is normally closed as shown in FIG. 3.

In the closed position of the valve 80, the lines 76 and 78 are closed off. A control line 82 connected to the line 76 leads to a normally closed control valve 84 of the first control means. A control line 86 connected to the line 78 leads to a normally closed control valve 88 of the second control means.

The main operating valve 80 is movable by solenoids 90,92 out of its closed position into a first position and into a second position: in the first position of the valve 80 the lines 82 and 76 leading to the first chamber 68 are connected to a pressure supply 94, and the lines 86 and 78 leading to the second chamber are connected to exhaust through a restriction 96. In the second position of the valve 80 the lines 86 and 78 are connected to the pressure supply 94 and the lines 82 and 76 are connected to exhaust through a restriction 98.

The control valve 84 of the first control circuit is also operated by a solenoid 85 between a first position, as shown in FIG. 3, in which the valve is closed, and a second position, in which the line 82 is connected to exhaust through a restriction 100.

The control valve 88 of the second control circuit is operated by a solenoid 89 between a first, closed, position as shown in FIG. 3, and a second, open, position in which the line 86 is connected to exhaust through a restriction 102.

It will be understood that the solenoids 85, 89, 90 and 92 are operated at desired times by signals from a timing system of the machine.

FIG. 3 shows the piston and cylinder arrangement 60 in position with the moulds of the mould mechanism open.

When the moulds are to close, a signal to solenoid 89 opens the second control valve 88 and vents air in the second chamber 72 to exhaust through the restriction 102, which is adjusted to offer little resistance to the flow of air. Solenoid 90 is then operated to connect the first chamber 68 to compressed air and to connect the line 78 to exhaust through the restriction 96, which offers considerable resistance to the flow of air. Movement of the piston 62 to the right (viewing FIG. 3) thus rapidly takes place. At a desired point before the end of the stroke of the piston 62 the solenoid 89 is deactivated, thus closing the valve 88 and causing any remaining air flowing out of the chamber 72 to flow through the tight restriction 96. This serves to cushion the end of the closing stroke of the piston and cylinder device 60.

When it is desired to open the moulds, solenoid 85 is activated to vent air from the first chamber 70 to exhaust through the restriction 100 which is adjusted to offer little resistance to the flow of air. Solenoid 90 is then deactivated and solenoid 92 activated to move the valve 80 into its second position, in which line 78 is connected to the air pressure supply 94 and line 76 is connected to exhaust through the restriction 98 which offers considerable resistance to air flow. Again at a desired point before the end of the return stroke of the piston 62 the solenoid 85 is deactivated, thus closing the valve 84 and thus cushioning the end of the return stroke.

It will be understood that this pneumatic mechanism provides a comparatively cheap and simple pneumatic circuit in which adjustable cushioning can be provided at the end of each stroke, the movement of the piston can be faster than in conventional mechanisms, and the appropriate timing control can vary the speed and the amount of cushioning in each stroke. Further, the main valve 80 is provided with springs in addition to the solenoids 90 and 92 so that in the event of a power failure, the valve 80 immediately moves to its closed position, thus to bring the mould mechanism immediately to rest.

Figure 4:
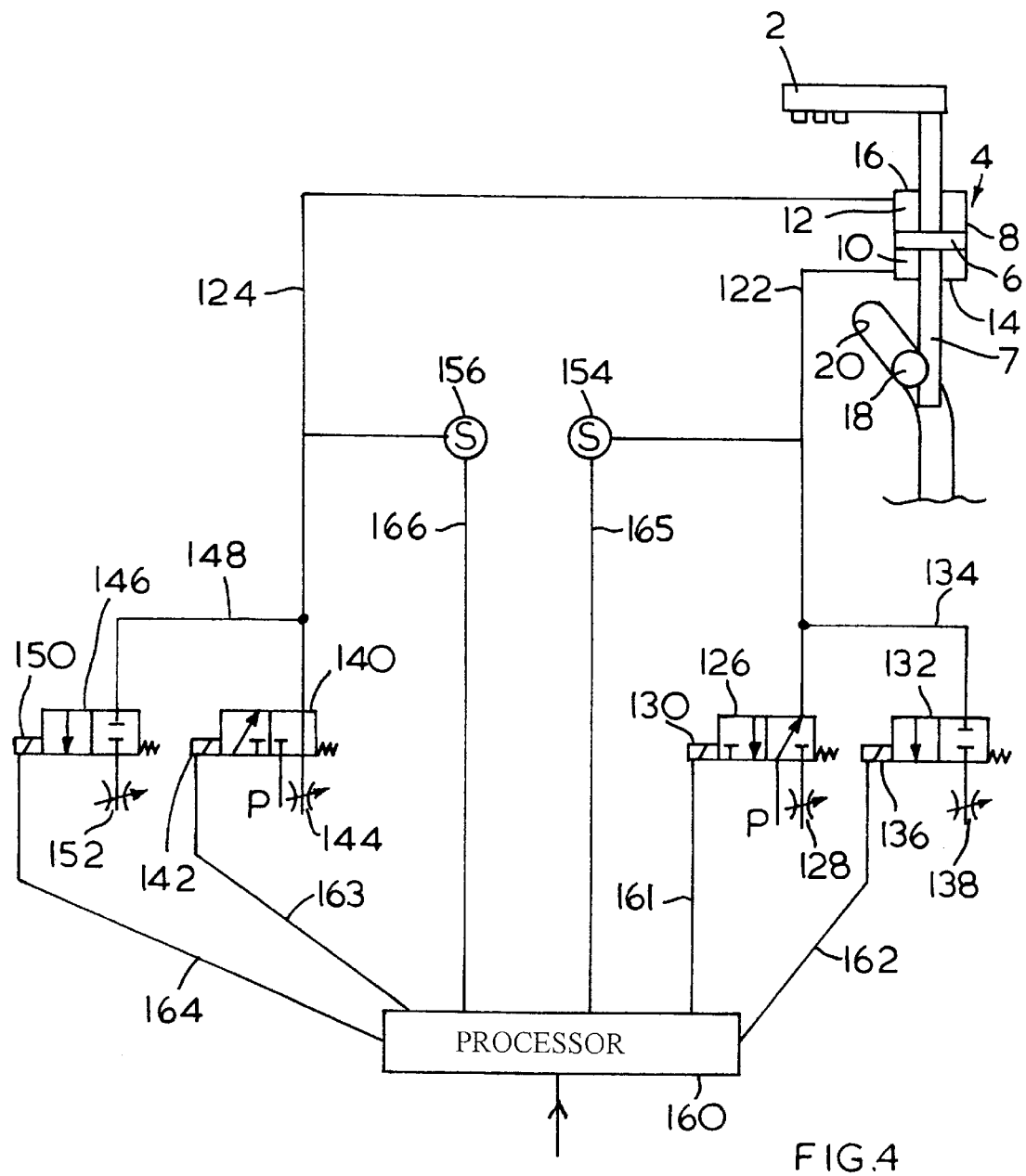
FIG. 4 shows diagrammatically a third pneumatically operated mechanism, for controlling the movement of a blow head in a glass container forming machine.

FIG. 4 shows a third pneumatically operated mechanism for controlling the movement of a blow head 2, in a glass container forming machine. In many respects the third pneumatically operated mechanism is similar to the first mechanism just described, and similar parts in the third mechanism are indicated by numerals one hundred greater than in FIG. 1.

The third mechanism comprises a first air line 122 leading to the first, lower, chamber 10, and a second air line 124 leading to the second, upper, chamber 12, and first and second control means for controlling the passage of air through the first and second air lines.

The first control means comprises a normally open, up operating valve 126 movable between a first, closed position in which the first chamber 10 is connected to exhaust through an adjustable restriction 128 and a second, open, position in which the first chamber 10 is connected to a source P of compressed air [as shown in FIG. 1]. Movement of the valve 126 between its first and second positions is obtained by operation of a solenoid 130 which operates in response to signals received from a control microprocessor 160 which is connected to an overall controller which provides operating timing signals.

The first control means also comprises a normally closed down speed control valve 132 and a control line 134 which connects the control valve 132 to the air line 122 between the chamber 10 and the operating valve 126.

The speed control valve 132 is movable, by operation of a solenoid 136, between a first, open, position, in which the control line 134 is connected to exhaust through an adjustable restriction 138, and a second, closed, position in which the control line 134 is not so connected (as shown in FIG. 1).

The second control mean closely resembles the first control means, and comprise a normally closed down operating valve 140 movable by a solenoid 142 between a first, closed position in which the second chamber 12 is connected to exhaust through an adjustable restriction 144 (as shown in FIG. 1), and a second, open, position in which the second chamber 12 is connected to compressed air P, and a normally closed up speed control valve 146 and a control line 148 which connects the control valve 146 to the air line 124 between the chamber 12 and the operating valve 140. The control valve 146 is moveable by operation of a solenoid 150 between a first, open, position in which the control line 148 is connected to exhaust through an adjustable restriction 152, and a second, closed, position (as shown in FIG. 1) in which the control line 148 is not so connected.

A pressure sensor 154 is connected to the line 122 and a pressure sensor 156 to the line 124. The processor 160 is connected to the solenoids 130, 136, 142, 150 and to the sensors 154 and 156 through conductors 161, 162, 163, 164, 165 and 166 respectively.

Figure 5A:
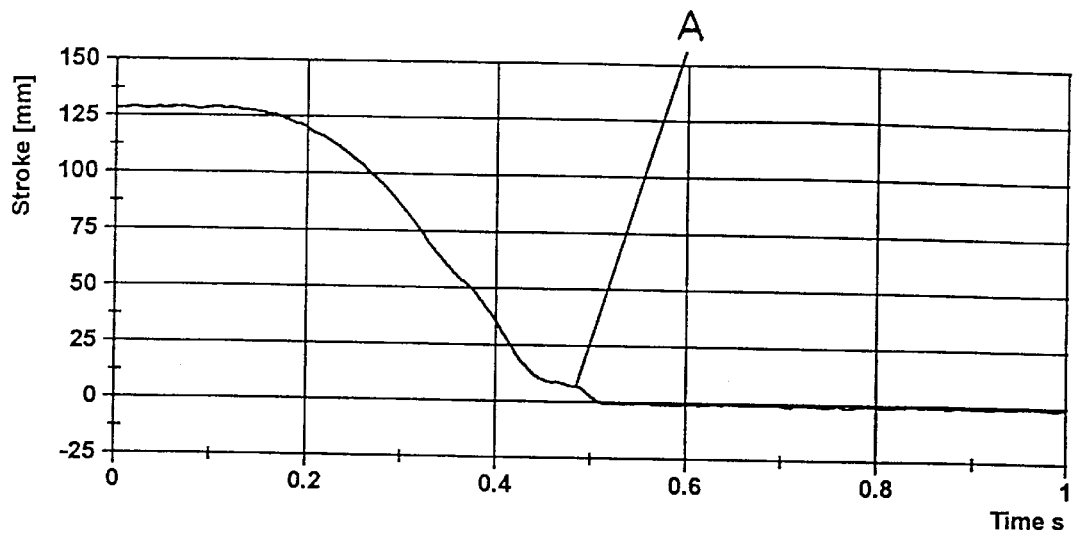
FIGS. 5A and 5B show the movement of a piston of the third mechanism in a down stroke with excessive cushioning and the pressures in chambers above and below the piston.

FIGS. 5A and B show, for a vertically operated pneumatic mechanism, typical movement of the piston 6 and the pressures in the upper and lower chambers for a downstroke with excessive cushioning. It will be noted that, at a point A, the piston is cushioned almost to bring it to a halt well before reaching its final end position.

Figure 6A:
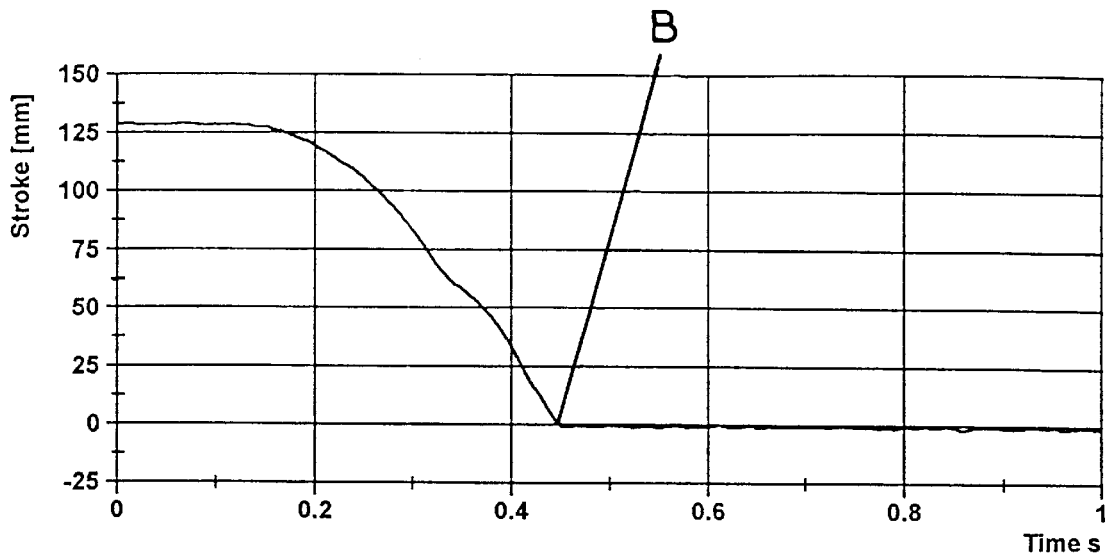
FIGS. 6A and 6B correspond to FIGS. 5A and 5B under conditions of insufficient cushioning.

FIGS. 6A and B show corresponding curves for a piston 6 with insufficient cushioning. It can be seen that at B the piston comes to an abrupt halt, almost certainly entailing banging of the mechanism.

Figure 7A:
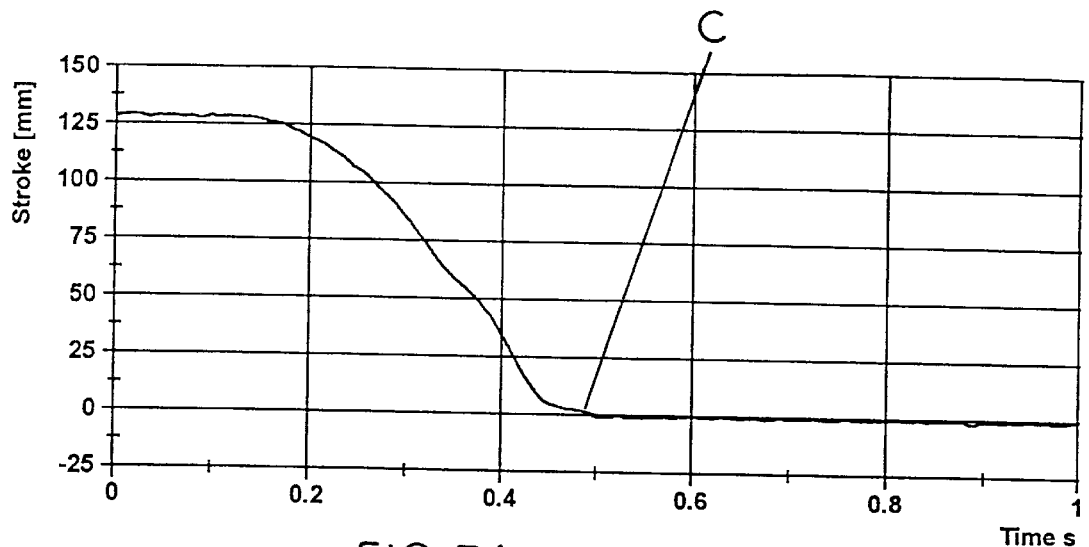
FIGS. 7A and 7B correspond to FIGS. 5A and 5B but show an up stroke with satisfactory cushioning.

FIGS. 7A and B show corresponding curves for the piston 6 with satisfactory cushioning. It can be seen at C that the piston comes smoothly to rest. Satisfactory cushioning is that which will bring the piston to a halt without causing jarring or banging of the mechanism and without requiring an undue time to do so.

Figure 5B:
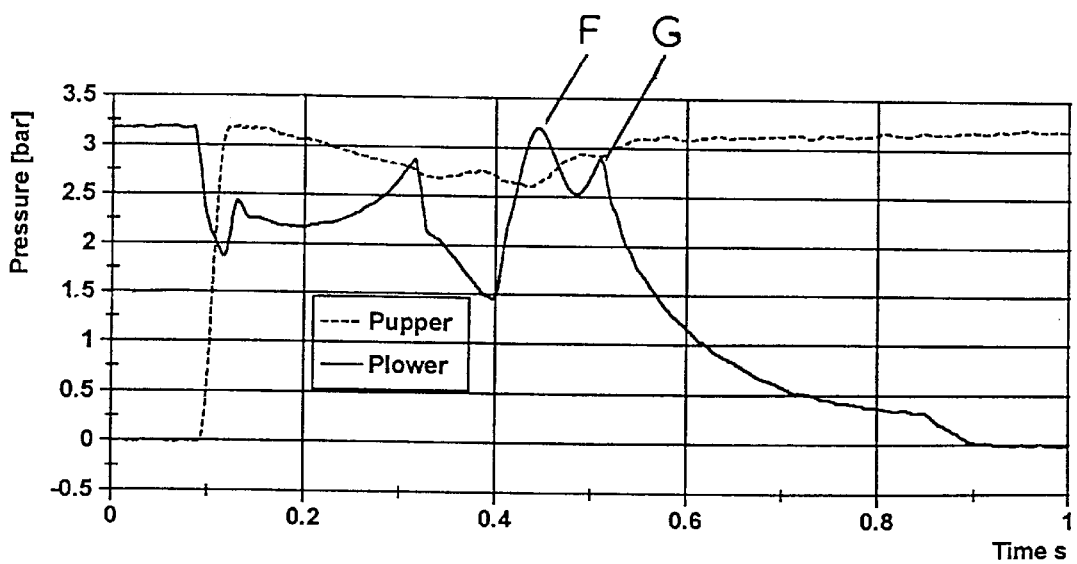
Figure 6B:
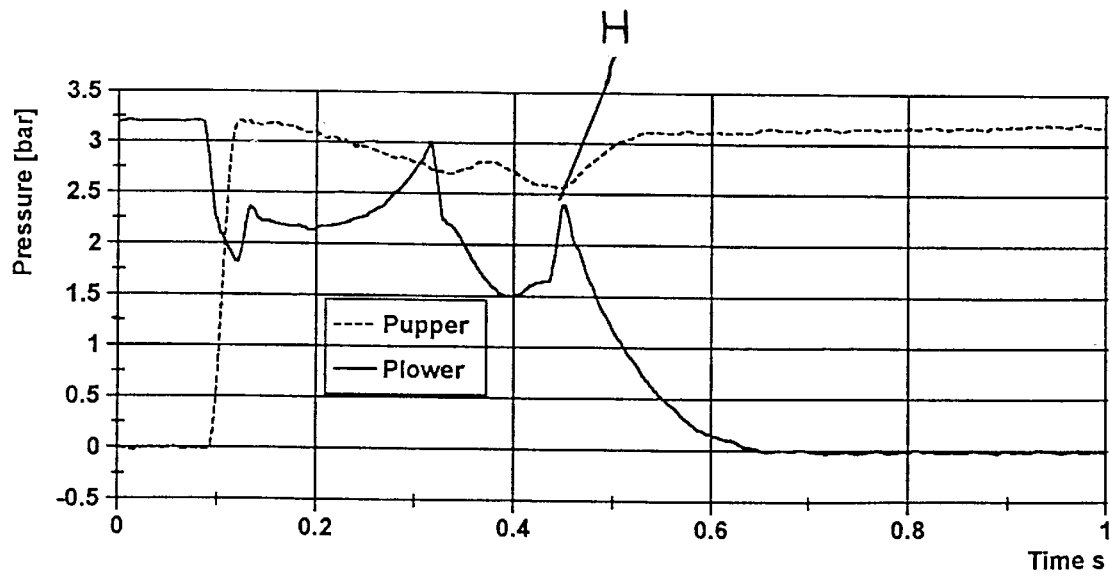
Figure 7B:
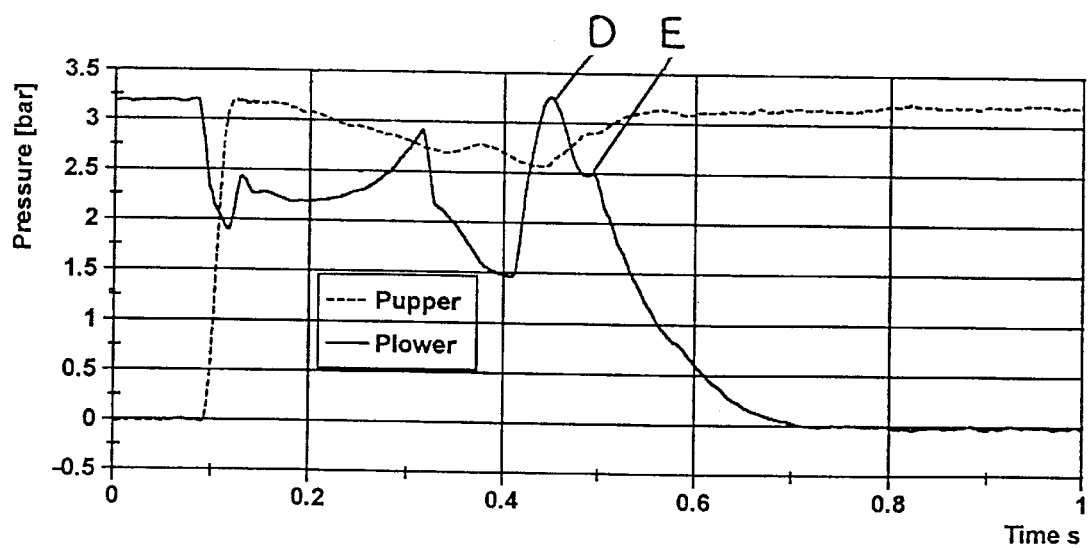

From FIG. 7B it can be seen that satisfactory cushioning on the down stroke is characterised by two pressure peaks in the lower chamber, a major peak D and a minor peak E. This can be contrasted with excessive cushioning (FIGS. 5A and 5B) which is characterised by two major pressure peaks F and G, and with insufficient cushioning (FIGS. 6A and 6B) which is characterised by a single peak H.

FIGS. 8A, 8B, 9A, 9B and 10A and 10B show similar curves for the up stroke of the piston.

Figure 8A:
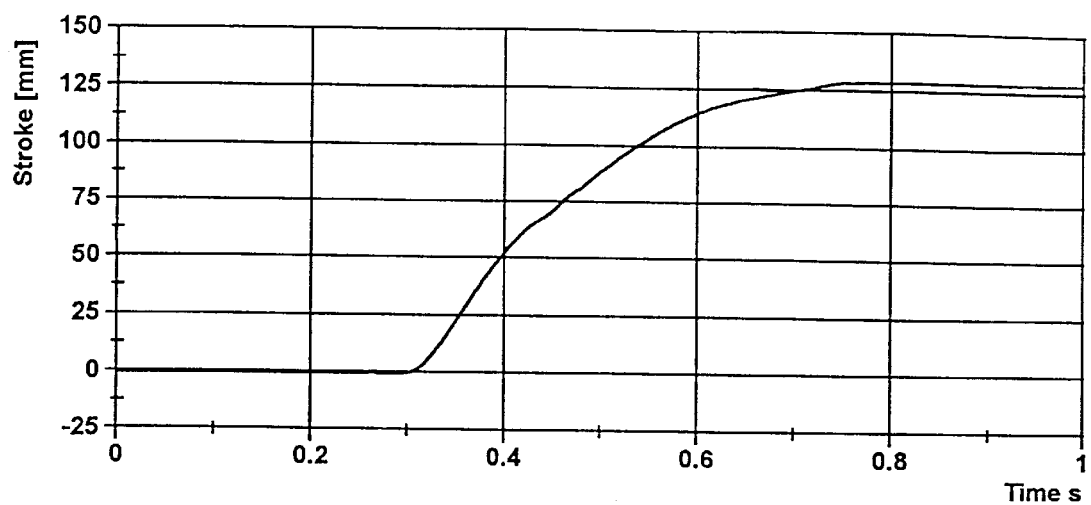
FIGS. 8A and 8B correspond to FIGS. 5A and 5B but show an up stroke with excessive cushioning.
Figure 8B:
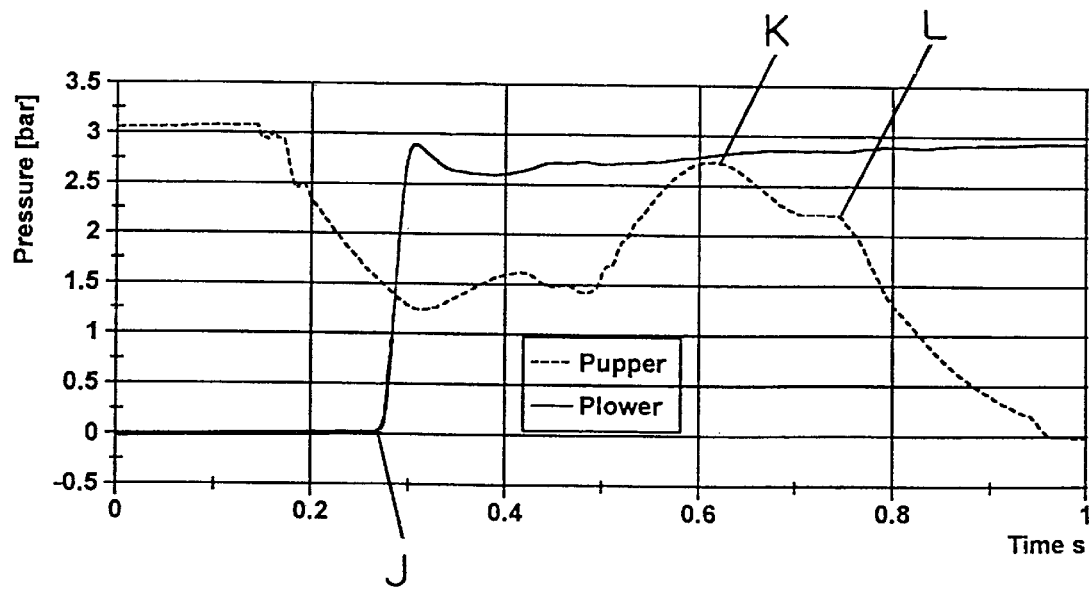

FIGS. 8A and 8B show typical movement and pressure variation for an up stroke with excessive cushioning. The time for the up stroke from the first supply of pressure under the piston (point J) to the piston coming to rest is significantly longer than under satisfactory cushioning (see FIGS. 10A & 10B).

Figure 9A:
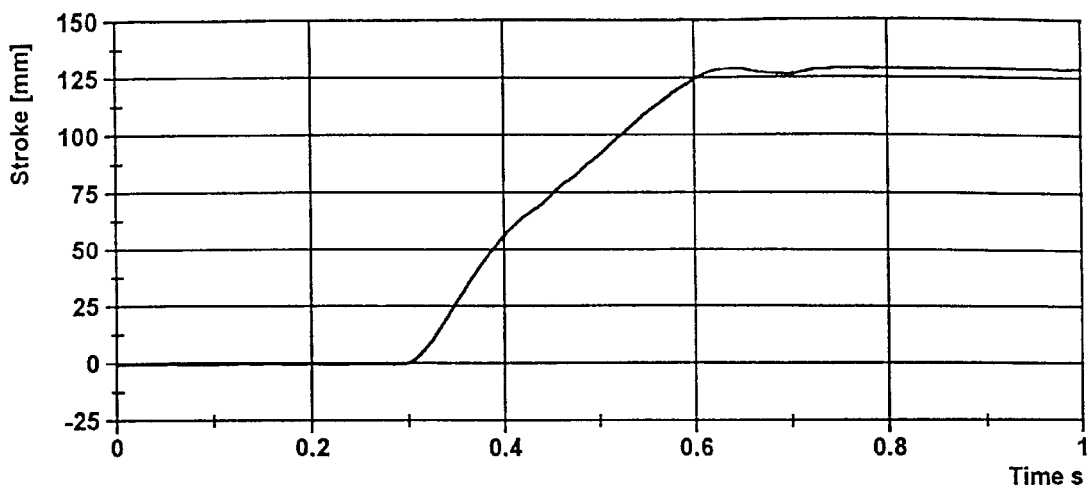
FIGS. 9A and 9B correspond to FIGS. 8A and 8B but with insufficient cushioning.
Figure 9B:
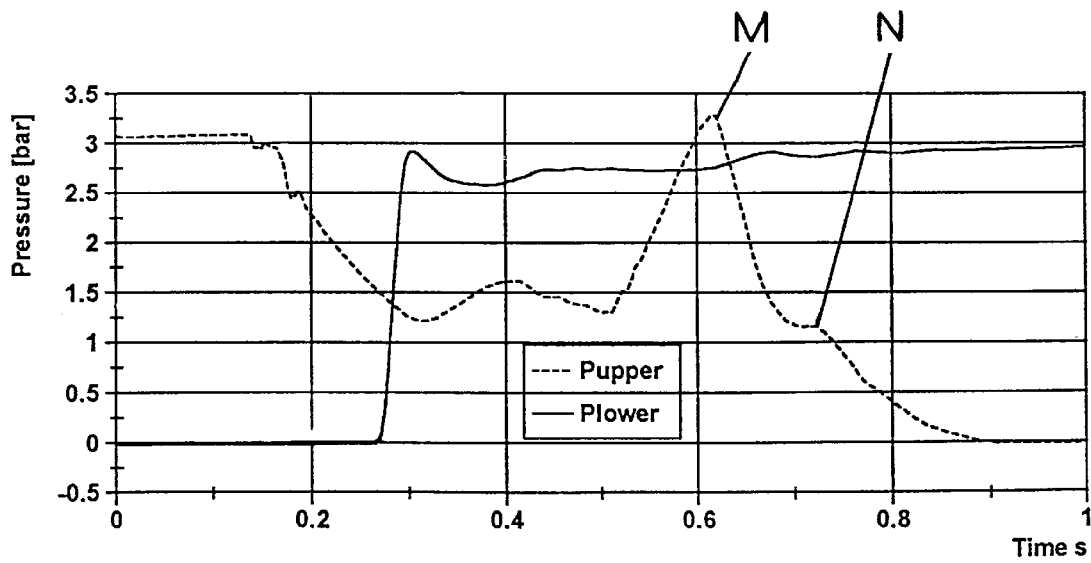

FIGS. 9A and 9B show typical movement and pressure variation with insufficient cushioning. It can be seen that the piston "bounces" at the end of the upstroke which causes excessive wear and tear of the mechanism.

Figure 10A:
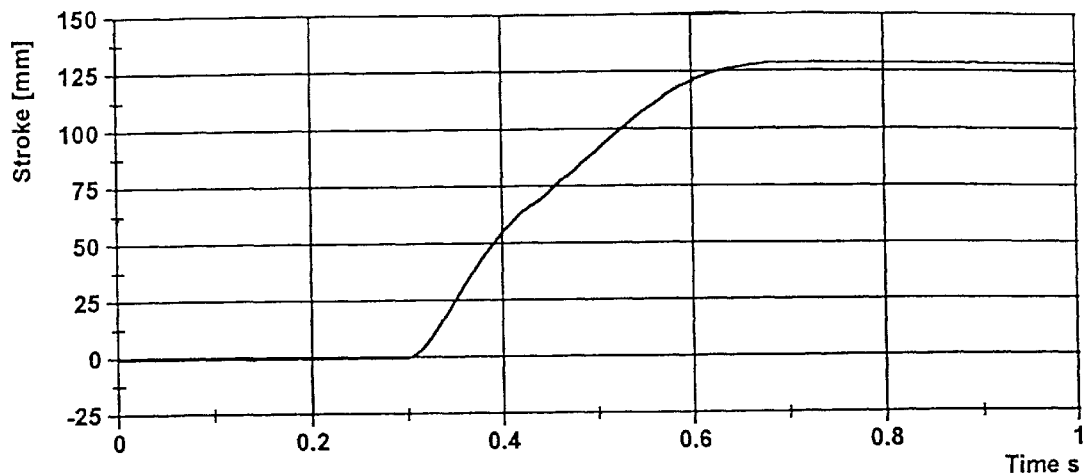
FIGS. 10A and 10B correspond to FIGS. 8A and 8B but with satisfactory cushioning.
Figure 10B:
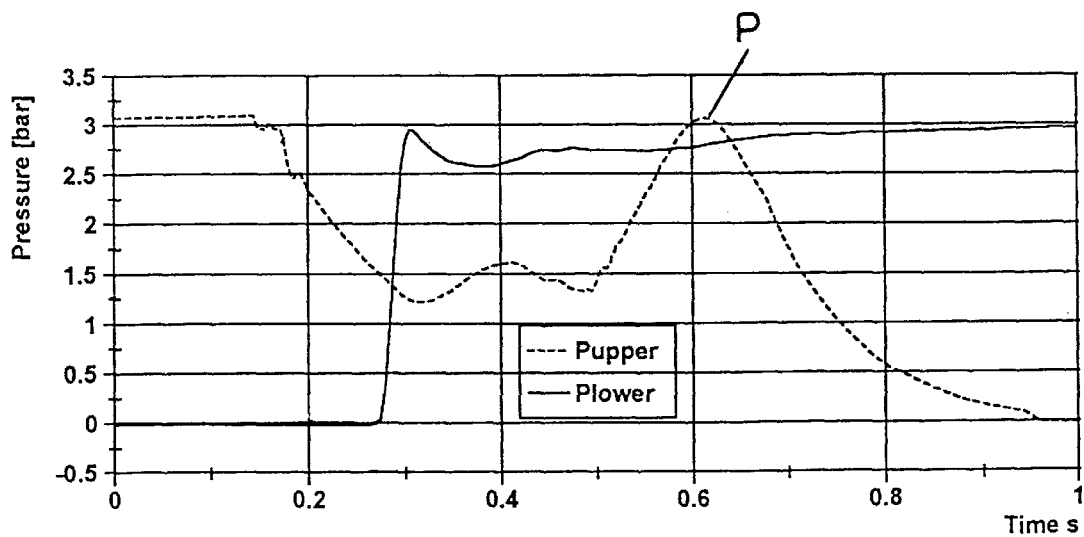

FIGS. 10A and 10B show typical movement and pressure variations with satisfactory cushioning. It can be seen that the piston comes smoothly to rest at the end of the upstroke.

Again it can be seen that with excessive cushioning (FIGS. 8A, 8B) the pressure in the upper chamber is characterised by one marked pressure peak K and one minor pressure peak, approximately ⅔ of the marked peak, at L.

With insufficient cushioning, the pressure in the upper chamber is characterised by one marked pressure peak M and one minor pressure peak N approximately ⅓ of the marked peak.

With satisfactory cushioning, the pressure in the upper chamber is characterised by only one marked pressure peak P.

The pneumatic operating mechanism of FIG. 4 can be utilised to obtain the desired cushioning on both the up and down strokes of the piston 6.

The processor 160 is arranged to generate four timing signals for on/off operation of various valves:

Motion Down Signal—sent along line 163 to down operating valve 140

Motion Up Signal—sent along line 161 to up operating valve 126

Fast Down Signal—sent along line 162 to down speed control valve 132

Fast Up Signal—sent along line 164 to up speed control valve 146.

Figure 11:
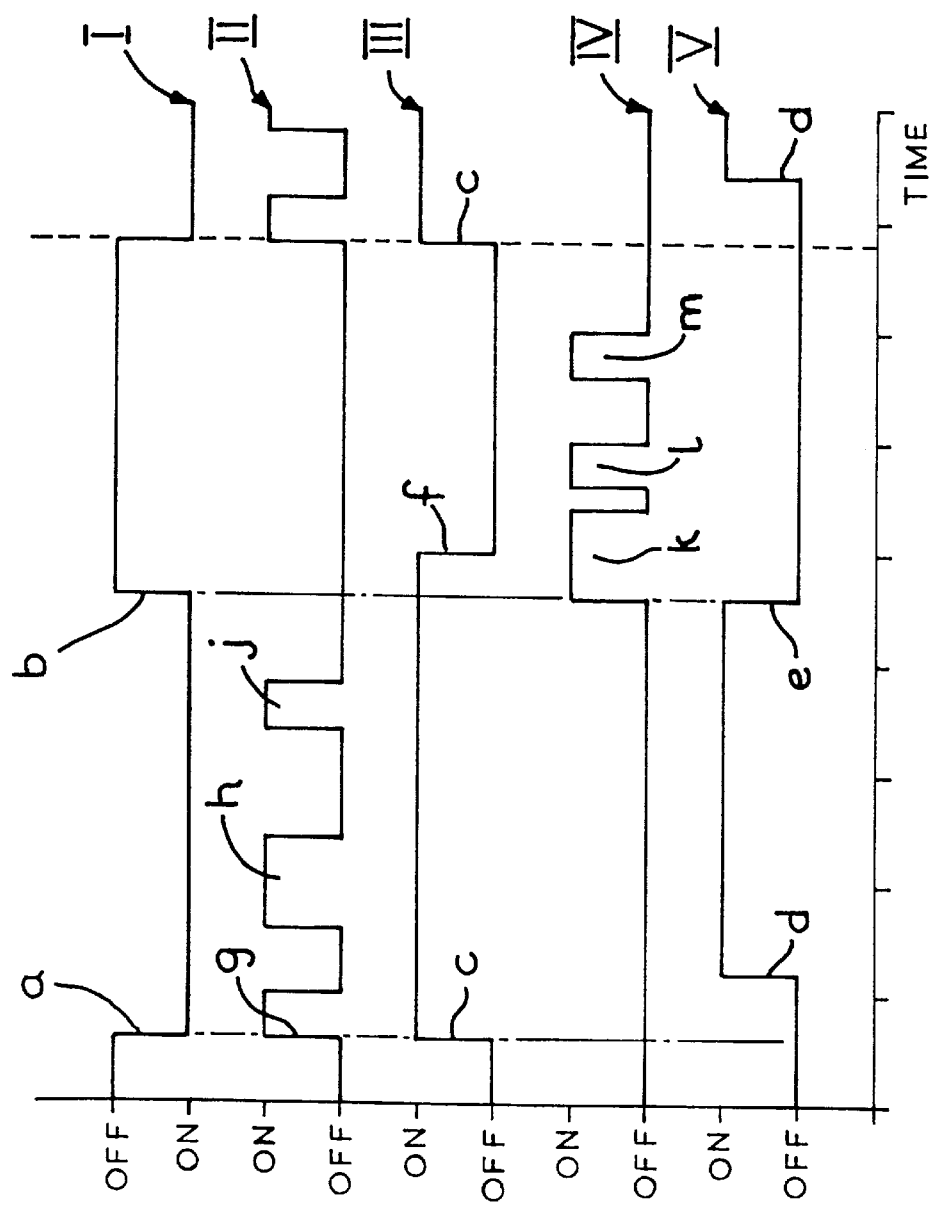
FIG. 11 shows diagrammatically the timing of various valves in the mechanism of FIG. 4.

FIG. 11 shows a typical timing sequence for the mechanism.

Graph I shows a timing signal from the overall controller to the control microprocessor 160.

Graph II shows the Fast Down Signal to the down speed control valve 132, which is normally closed.

Graph III shows the Motion Up Signal to the normally open up operating valve 126.

Graph IV shows the Fast Up Signal to the normally closed up speed control valve 146.

Graph V shows the Motion Down Signal to the normally closed down operating valve 140.

A timing on-signal (a) is provided from the overall controller to the control microprocessor to initiate down stroke movement.

This immediately operates (Graph III) to open the up operating valve 126 (c) thus venting the lower chamber 10. This pre-exhaust is followed after a short delay by an on signal (d) (Graph V) to the normally closed down operating valve 140 to open the valve 140 and thus connect the upper chamber 12 to pressure.

A timing off signal (b) is then provided to initiate up stroke movement.

This immediately operates (e) (Graph V) to vent the upper chamber 12 to exhaust through the valve 140 to pre-exhaust the chamber 12. After a short delay an off signal (f) (Graph III) is provided to the up operating valve, to connect the lower chamber 10 to pressure thus to initiate the up stroke. On completion of the up stroke the cycle is repeated.

Graphs II and IV show the signals to the down and up speed control valves 132 and 146: the timings of the operation of these valves are adjusted to obtain the desired speed of movement and cushioning of the mechanism.

As shown in Graph II the down speed control valve 132 may be switched on three times during the down stroke motion, each time connecting the lower chamber 10 to exhaust. The first switching (g) is coincident with the timing signal (a) and the length of the interval determines the acceleration at the beginning of the down stroke motion. The second switching (h) by its length and timing determines the speed and cushioning of the piston towards the end of the down stroke. It may be desirable to merge the first and second switchings. The third switching (j) serves quickly to exhaust any pressure in the lower chamber 10 after the down position of the piston has been reached.

As shown in Graph IV the up speed control valve 146 may also be switched on three times during the up stroke. The first switching (k) is coincident with the up timing signal (b), and the length of the first switching determines the acceleration at the beginning of the up stroke motion by venting the upper chamber 12 to exhaust. The length and timing of the second switching (l) determines the speed and cushioning at the end of the up stroke—again on occasion the first and second switchings can be merged into one. The third switching (m) may be used rapidly to exhaust any pressure in the upper chamber 12 when the piston has moved into its upper position.

As described the cushioning of the mechanism can be determined by the timing of the two speed control valves 132 and 146. The pressure sensors 154 and 156 feed signals indicating the pressure in the lower and upper chambers 10 and 12 into the processor 160. Identification of the peaks of pressure in the lower chamber 10 enables the processor to determine whether the cushioning of the down stroke is excessive, inadequate or satisfactory (see FIGS. 5B, 6B, 7B). Identification of the peaks of pressure in the upper chamber 12 enables the processor to determine whether the cushioning of the up stroke is excessive, inadequate or satisfactory (see FIGS. 8B, 9B and 10B).

Figure 12:
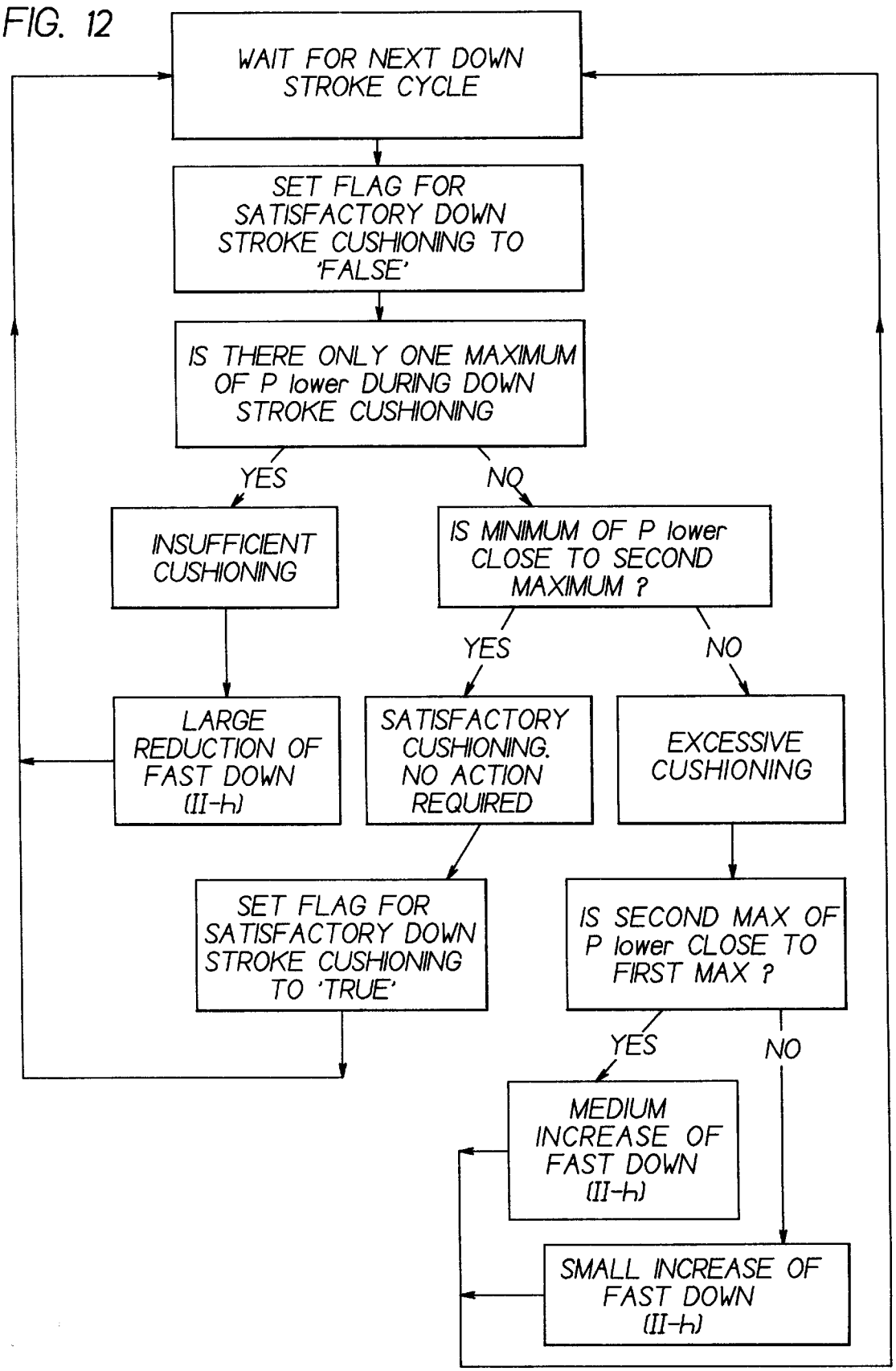
FIG. 12 shows an algorithm for the control of down stroke cushioning.

FIG. 12 shows an algorithm for setting the down stroke cushioning into a satisfactory condition. The down stroke cushioning is adjusted by adjusting the duration of the Fast Down Signal, signal (h) on graph II of FIG. 11. If (h) is too long, the cushioning is insufficient: if it is too short the cushioning is excessive.

Figure 13:
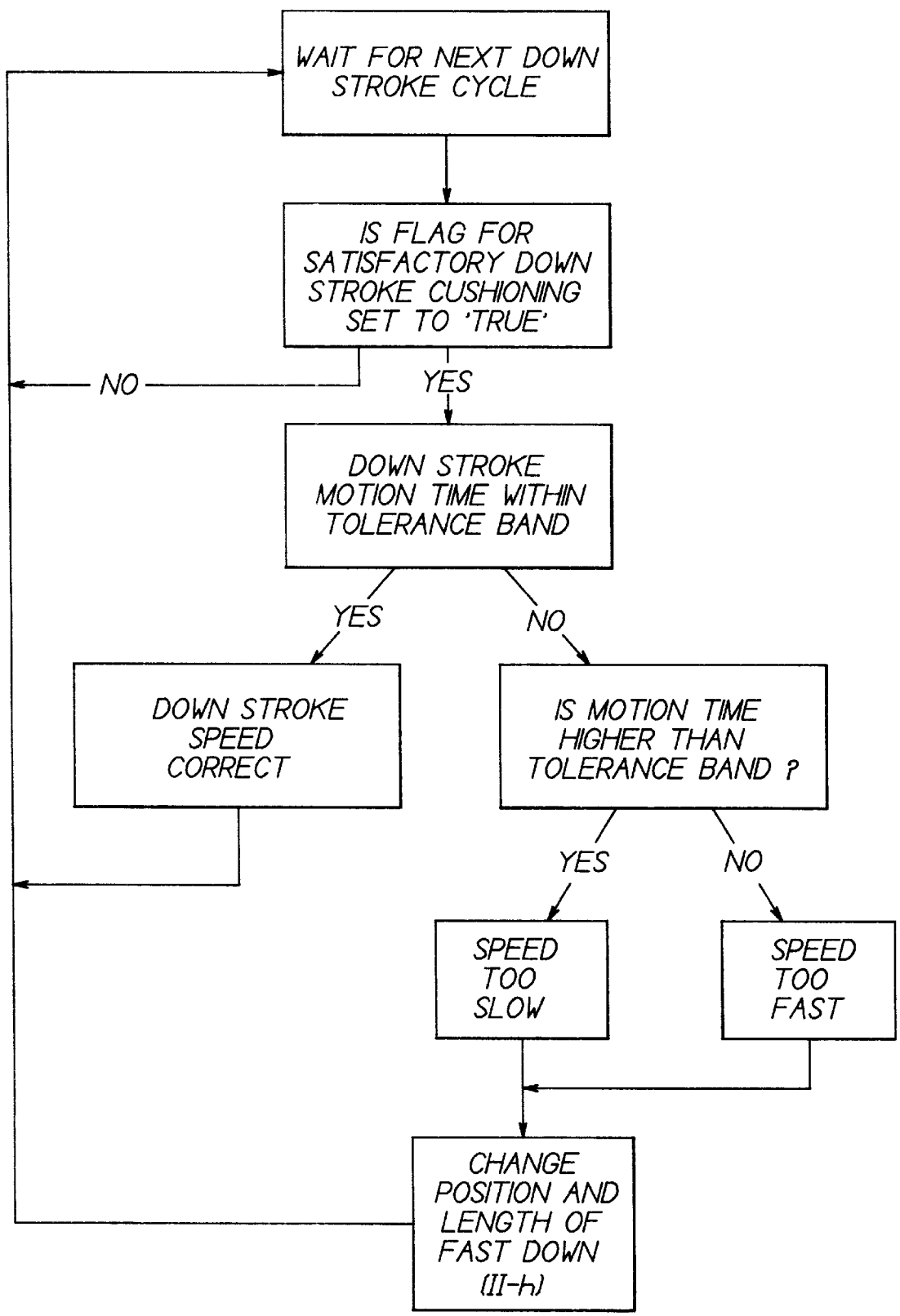
FIG. 13 shows an algorithm for the control of down stroke motion time.

FIG. 13 shows an algorithm for setting the down stroke motion time. The down stroke motion time is also adjusted by adjusting the duration and timing of the Fast Down Signal (h) on Graph II of FIG. 11. The earlier the signal is given, the faster the down stroke.

Down stroke motion time can also be adjusted by adjusting the duration of Fast Down Signal (g) on Graph II of FIG. 11 or by adjusting the delay of Motion Down Signal (d) on Graph V of FIG. 11. In most circumstances adjustment of the signals (g) and (d) may be made as part of the setting up of the mechanism, and the algorithm operates to adjust the down stroke by adjustment of signal (h). However if desired the algorithm can be modified also to adjust signal (g) and (d).

Figure 14:
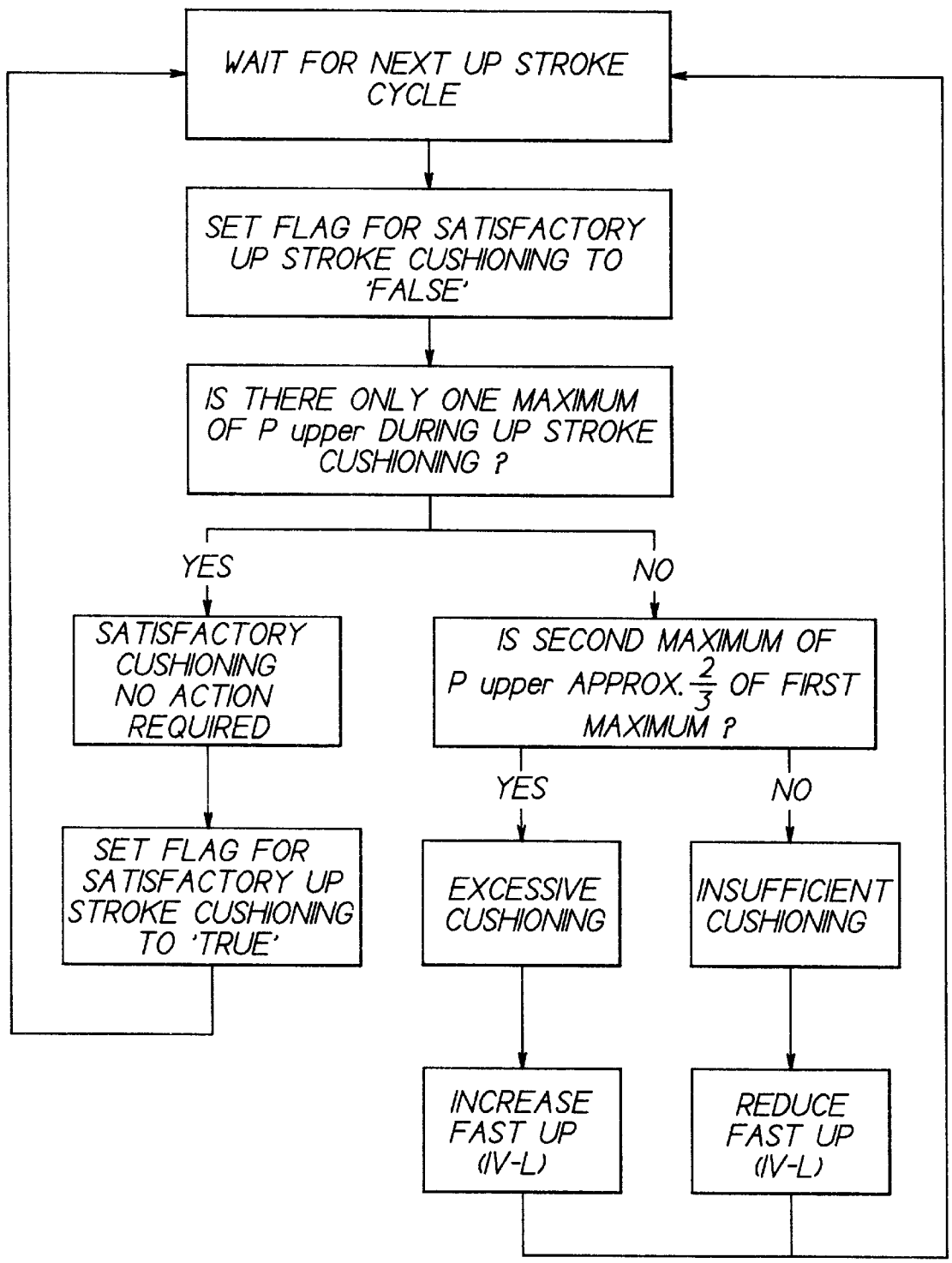
FIG. 14 shows an algorithm for the control of up stroke cushioning.

FIG. 14 shows an algorithm for setting the up stroke cushioning into a satisfactory condition. The upstroke cushioning is adjusted by adjusting the duration of the Fast Up Signal, signal (l) on graph IV of FIG. 11.

Figure 15:
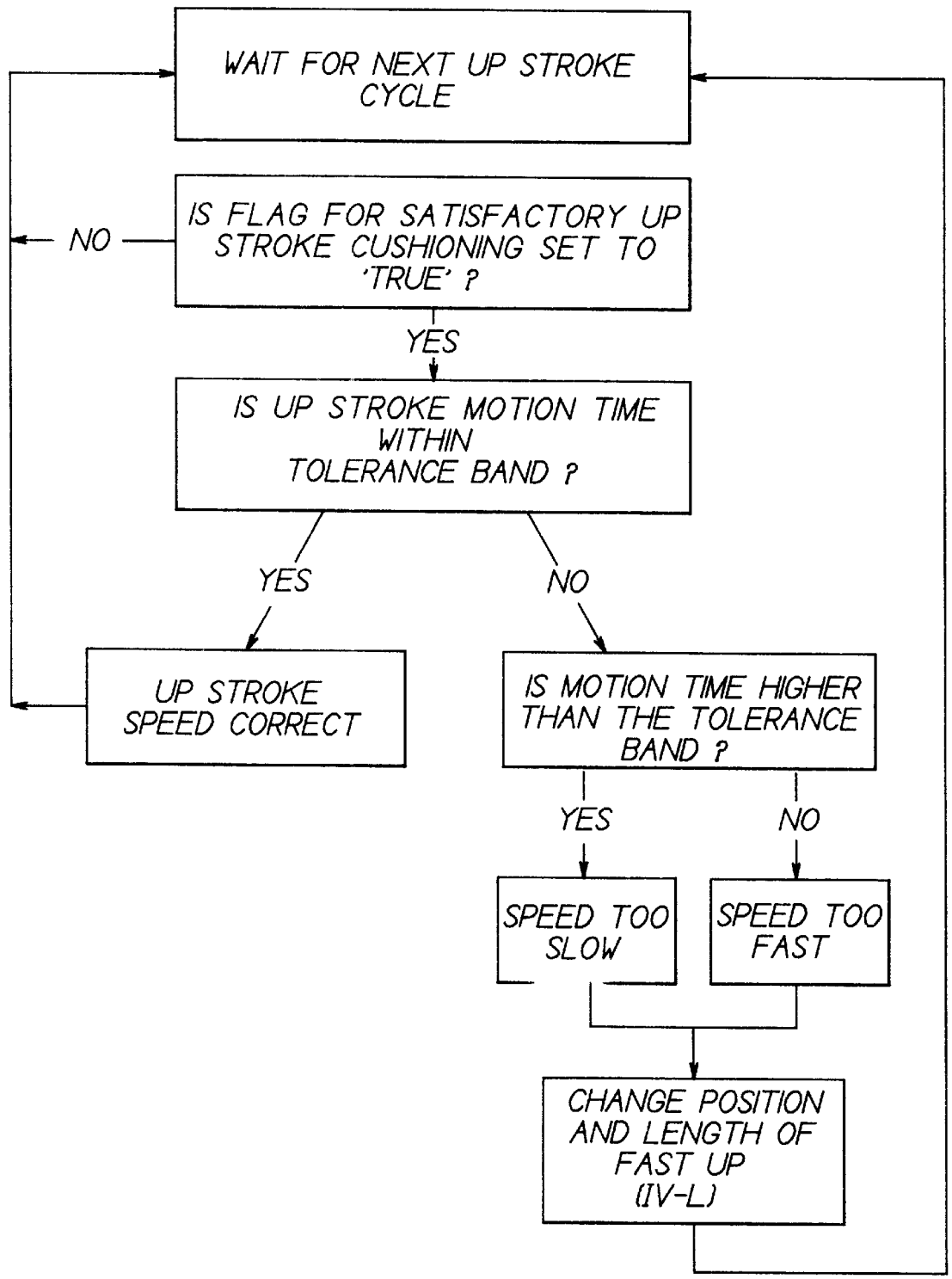
FIG. 15 shows an algorithm for the control of up stroke motion time.

FIG. 15 shows an algorithm for setting the up stroke motion time, again by adjusting the timing and duration of the signal (l).

Upstroke motion time can also be adjusted by adjusting the duration of Fast Up Signal (k) (Graph IV) or the delay of Motion Up Signal (f) (Graph III). Again if desired adjustment of these signals (k) and (f) may be achieved in a modified algorithm instead of relying on adjustment of the signal (L).

The third pneumatic mechanism just described utilises monostable valves. A modification using bistable valves is of course possible as the pressure conditions in the cylinders would not be affected by a change from monostable to bistable valves.

What is claimed is:

1. A system for displacing a piston between opposite ends of a cylinder comprising a first conduit communicating with one end of the cylinder and a second conduit communicating with the other end of the cylinder, a first pressure valve settable either at a first position connecting the first conduit to a source of pressure or to a second position connecting the first conduit a highly restrictive exhaust, a second pressure valve settable either at a first position connecting the second conduit to a highly restrictive exhaust or a second position connecting the second conduit to a source of pressure, a first speed control valve settable at a first position where no flow occurs or at a second position connecting the first conduit to a slightly restrictive exhaust, a second speed control valve settable at a first position connecting the second conduit to a slightly restrictive exhaust or to a second position where no flow occurs, and a control for operating in a first mode for a selected period of time prior to the beginning of displacement of the piston from the other end of the cylinder to the one end including means for setting said first pressure valve to said second position, said second pressure valve to said first position, said first speed control valve to said second position and said second speed control valves to the first position, for operating in a second mode for a predetermined period of time following the passage of said selected period of time including means for changing the setting of said second pressure valve and said second speed control valve to the second position at the beginning of the predetermined period of time, and for operating for a set period of time, following said predetermined period of time, in a third mode including means for changing the setting of said first speed control valve to the first position at the beginning of the set period of time.

2. A system for displacing a piston between opposite ends of a cylinder according to claim 1, wherein said control operates a selected period of time, following said set period of time, in a fourth mode including means for changing the setting of said first speed control valve to the second position at the end of the set period of time.

3. A system for displacing a piston between opposite ends of a cylinder according to claim 2, wherein said control operates in a fifth mode for a predetermined period of time following the selected period of time the control operates in the fourth mode including means for changing the setting of said first speed control valve to the first position at the end of the selected period of time the system operates in the fourth mode.

4. A system for displacing a piston between opposite ends of a cylinder according to claim 3, wherein said control operates in a sixth mode for a set period of time, following said predetermined period of time in which the system operates in the fifth mode, including means for changing the setting of said first speed control valve to the second position at the end of the predetermined period of time of the fifth mode.

5. A system for displacing a piston between opposite ends c a cylinder according to claim 4, wherein said control operates in a seventh mode for a selected period of time following the predetermined period of time the control operates in the sixth mode including means for changing the setting of said first speed control valve to the first position at the end of the predetermined period of time the system operates in the sixth mode.

* * * * *